US010573193B2

(12) United States Patent
Klein et al.

(10) Patent No.: US 10,573,193 B2
(45) Date of Patent: Feb. 25, 2020

(54) VIDEO AUTHORING AND SIMULATION TRAINING TOOL

(71) Applicant: SHADOWBOX, LLC, Dayton, OH (US)

(72) Inventors: Allan Gary Klein, Washington, DC (US); Helen Altman Klein, Washington, DC (US); Joseph Borders, Kettering, OH (US); Michael Morley, Englewood, FL (US)

(73) Assignee: SHADOWBOX, LLC, Dayton, OH (US)

( * ) Notice: Subject to any disclaimer, the term of this patent is extended or adjusted under 35 U.S.C. 154(b) by 0 days.

(21) Appl. No.: 15/977,268

(22) Filed: May 11, 2018

(65) Prior Publication Data

US 2018/0330630 A1 Nov. 15, 2018

Related U.S. Application Data

(60) Provisional application No. 62/504,965, filed on May 11, 2017.

(51) Int. Cl.
*G09B 7/04* (2006.01)
*G09B 5/02* (2006.01)
(Continued)

(52) U.S. Cl.
CPC ............... *G09B 7/04* (2013.01); *G09B 5/02* (2013.01); *G09B 19/00* (2013.01); *H04N 21/435* (2013.01);
(Continued)

(58) Field of Classification Search
CPC ...... G09B 19/003; G09B 5/065; G09B 23/28; G09B 5/02; G09B 7/04; G09B 19/00;
(Continued)

(56) References Cited

U.S. PATENT DOCUMENTS

| 5,432,940 A | 7/1995 | Potts et al. |
| 6,736,642 B2 | 5/2004 | Bajer et al. |

(Continued)

OTHER PUBLICATIONS

Joseph Borders, Noel Polander, Gary Klein, Corinne Wright, "ShadowBox™: Flexible training to impart the expert mindset", 2015, ScienceDirect, Procedia Manufacturing 3, pp. 1574-1579.*

(Continued)

*Primary Examiner* — Jack Yip
(74) *Attorney, Agent, or Firm* — Thomas E. Lees, LLC (57) ABSTRACT

A process for simulating an expert experience comprises playing an expert simulation for a user, where the expert simulation is a processed video with tagged objects and untagged objects. During playback, a user may make an unprompted selection of an object in the video of the expert simulation, and the unprompted selection is received. In response to receiving the unprompted selection from the user, an entry interface for the user to enter in a freeform rationale is provided. After the user enters a freeform rationale through the entry interface, the freeform rationale is received. An expert rationale associated with a tagged object is displayed. Further, a process for creating the expert simulation comprises receiving raw video and superimposing a grid onto the raw video. An author tags objects within the video spatially, temporally, or both. Further, freeform data (e.g., an expert rationale) is associated with the tagged object.

2 Claims, 9 Drawing Sheets

(51) Int. Cl.
*H04N 21/435* (2011.01)
*H04N 21/44* (2011.01)
*G09B 19/00* (2006.01)
*G09B 5/06* (2006.01)
*G09B 23/28* (2006.01)
*A63B 24/00* (2006.01)

(52) U.S. Cl.
CPC .......... *H04N 21/44* (2013.01); *A63B 24/0003* (2013.01); *A63B 2024/0012* (2013.01); *A63B 2220/806* (2013.01); *G09B 5/065* (2013.01); *G09B 19/003* (2013.01); *G09B 23/28* (2013.01)

(58) Field of Classification Search
CPC .......... A63B 2220/806; A63B 24/0003; A63B 2024/0012; H04N 21/435; H04N 21/44
USPC ........................................................ 434/362
See application file for complete search history.

(56) References Cited

U.S. PATENT DOCUMENTS

| | | | | |
|---|---|---|---|---|
| 7,577,978 | B1* | 8/2009 | Wistendahl | A63F 13/12 725/113 |
| 7,621,748 | B2 | 11/2009 | Bajer et al. | |
| 2002/0115047 | A1* | 8/2002 | McNitt | A63B 24/0003 434/252 |
| 2004/0002049 | A1* | 1/2004 | Beavers | G09B 5/00 434/350 |
| 2006/0003300 | A1* | 1/2006 | Davis | A63B 24/0003 434/247 |
| 2006/0236240 | A1* | 10/2006 | Lebow | G06F 17/24 715/210 |
| 2008/0254419 | A1* | 10/2008 | Cohen | G09B 7/00 434/219 |
| 2010/0169906 | A1 | 7/2010 | Takahashi | |
| 2011/0013087 | A1* | 1/2011 | House | A63B 24/0021 348/564 |
| 2012/0167146 | A1 | 6/2012 | Incorvia | |
| 2012/0237915 | A1 | 9/2012 | Krohner et al. | |
| 2014/0037165 | A1* | 2/2014 | King | A61B 5/748 382/128 |
| 2016/0096112 | A1 | 4/2016 | Sharma et al. | |
| 2016/0293032 | A1* | 10/2016 | Daetwyler | G09B 5/065 |
| 2016/0293037 | A1* | 10/2016 | Jacques | G09B 9/02 |
| 2016/0365121 | A1* | 12/2016 | DeCaprio | G11B 27/036 |
| 2016/0379371 | A1 | 12/2016 | Chen et al. | |
| 2017/0013306 | A1 | 1/2017 | Kulas | |
| 2017/0103664 | A1* | 4/2017 | Wong | G09B 7/00 |
| 2018/0165979 | A1* | 6/2018 | Correia Gracio | G06Q 10/06398 |
| 2018/0293802 | A1* | 10/2018 | Hendricks | G06T 19/006 |

OTHER PUBLICATIONS

AlphaTrac, Inc.; "AlphaACT FIRE"; located at http://www.alphatrac.com/Products/AlphaACTTechnology/AlphaACTFIRE.aspx; Sep. 4, 2015.

BranchTrack; "BranchTrack Platform Overview"; downloaded on Feb. 15, 2017 at https://branchtrack.com/.

\* cited by examiner

VIDEO AUTHORING AND SIMULATION TRAINING TOOL

CROSS REFERENCE TO RELATED APPLICATIONS

This application claims the benefit of U.S. Provisional Patent Application Ser. No. 62/504,965, filed May 11, 2017, entitled "VIDEO AUTHORING AND SIMULATION TRAINING TOOL", the disclosure of which is hereby incorporated herein by reference.

BACKGROUND

Various aspects of the present invention relate generally to expert training tools, and more specifically to the computer-related technology of computer-based authoring and training tools.

Recognizing patterns, making pinpoint discriminations, and judging what is normal and abnormal are perceptual skills that usually set apart experts from novices. Some tools are available that try to take advantage of the perceptual skills of experts and train novices. For example, a novice may be shown a photo and presented with choices to determine what is abnormal about the picture. As another example, a scripted video may play for the novice and will prompt the novice to indicate what is normal or abnormal.

BRIEF SUMMARY

According to aspects of the present invention, a process for simulating an expert experience comprises playing an expert simulation for a user, where the expert simulation is a processed video with tagged objects and untagged objects. During playback, a user may make an unprompted selection of an object in the video of the expert simulation, and the unprompted selection is received. In response to receiving the unprompted selection from the user, an entry interface for the user to enter in a freeform rationale is provided. After the user enters a freeform rationale through the entry interface, the freeform rationale is received. An expert rationale associated with a tagged object is displayed.

According to other aspects of the present disclosure, a process for creating the expert simulation comprises receiving raw video and superimposing a grid onto the raw video. An author tags objects within the video spatially, temporally, or both. Further, freeform data (e.g., an expert rationale) is associated with the tagged object.

DETAILED DESCRIPTION

According to aspects of the present disclosure, a computer-based authoring tool and simulation tool allow a user (i.e., a trainee) to focus on perceptual skills for situations (e.g., police, military, medical, etc.) without a need for an expert to be present. Basically, the present invention includes two parts: (1) an authoring tool; and (2) a simulation tool. The authoring tool allows an expert (i.e., author) to create a simulation from a video. For example, the expert may tag objects in frames of a video and associate a correct rationale on why the object is tagged. Thus, the object is bounded spatially (i.e., a position somewhere within a set of frames) and temporally (e.g., between two absolute timestamps) and has some sort of associated data (e.g., the expert's rationale for why the object is to be selected).

The simulation tool plays back the simulation video and allows a user (i.e., a trainee) to click on objects within the video without being prompted to do so. However, in some cases, there are decision/action prompts for the user to indicate an action. Once the user clicks on the video (whether correctly or incorrectly), the user may add a rationale on why the user clicked on that object. Then, the simulation tool will look up the rationale provided by the expert (from the authoring tool) and display that rationale to the user, so the user may compare the expert's rationale with the user's rationale. If the user clicks on a non-tagged object or outside of the allotted time period for a tagged object, then no expert rationale will be displayed.

While some of the user interactions may be prompted, it is the unprompted interactions with open-ended responses that the user has with the video that test the user's perceptual skills. The processes, systems, and devices set out herein allow a user to be trained by an expert in perception without the expert being present for (or even aware that) the user is undergoing training.

Figure 1:
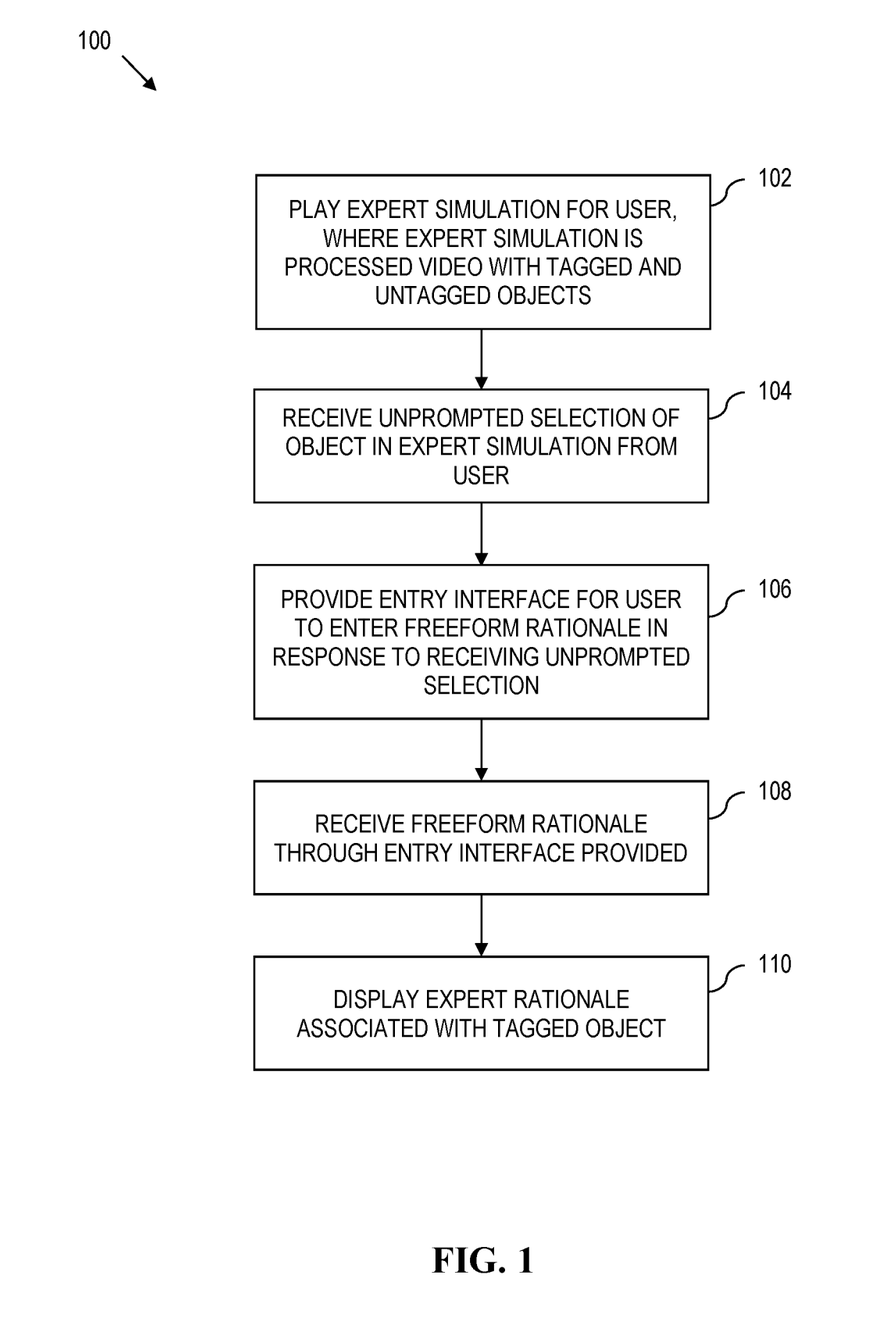
FIG. 1 is a flowchart illustrating a process for simulating an expert experience via an expert simulation, according to various aspects of the present disclosure.

Referring to drawings and in particular FIG. 1, a process 100 for training through a simulation of an expert experience is presented. In this regard, the process 100 may be implemented on computer-readable hardware that stores machine-executable program code, where the program code instructs a processor to implement the described method. The process 100 may also be executed by a processor coupled to memory, where the processor is programmed by program code stored in the memory, to perform the described process.

At 102, an expert simulation, which is a processed video with both tagged objects and untagged objects, is played for a user. For example, an author may create an expert simulation using the systems and processes set forth below, and that expert simulation may be played for a user (i.e., a trainee). Such an expert simulation is played on a video screen for the user.

At 104, an unprompted selection of an object in the expert simulation from the user. For example, while the expert simulation is playing, a cursor may be provided for the user to control. The cursor may be of any shape, including an annulus or a circle that includes a selection area of several pixels (e.g., the selection area may be the area bounded by the annular cursor). Therefore, the user may select an object with the cursor while the video is playing. It is important to note that the selection of the object by the user is unprompted such that the user must use perceptual skills to determine whether an object is of interest within the expert simulation.

As mentioned above, there may be tagged and untagged objects within the expert simulation. Objects may be tagged spatially and temporally. For example, if there is a skateboard in the expert simulation, then while a person is riding the skateboard, the skateboard is an untagged object. However, later in the expert simulation the person may pick up the skateboard and hold it as a weapon. At that point, the skateboard may be a tagged object (depending on the expert who authored the simulation from video, as discussed below).

At 106, in response to receiving the unprompted selection of an object, an entry interface is provided to the user such that the user may enter in a freeform rationale as to why the user selected the object. For example, a text box may be displayed for the user to enter a textual rationale.

In some embodiments, when the entry interface is provided to the user, the expert simulation is paused so the user has time to enter the freeform rationale without missing any part of the expert simulation. In other embodiments, the entire expert simulation plays through and the user selections are recorded such that an entry interface for each time the user selected an object is provided to the user after the simulation plays through in its entirety.

At 108, the freeform rationale from the user is received through the entry interface. For example, the user may type in a text-based rationale on why the user selected an object and hit an enter button. Once the enter button is pushed, the rationale is received. In some embodiments, the user may cancel the selection (e.g., through the use of a "cancel" button) such that the selection will be ignored.

At 110, after the freeform rationale is received from the user, an expert rationale (provided by the author as detailed below) associated with the selected object is displayed to the user. This is assuming that there is an expert rationale associated with the selected object. In other words, the selected object must be a tagged object in order for the expert rationale to be displayed. Moreover, the user may compare the freeform rationale with the expert rationale.

Further, if a tagged object is not selected, the expert rationale associated with the tagged object may be presented near the end of the expert simulation, as described below. As such, the user can see how closely the selection and the tagged object overlap spatially and temporally. Even slight differences in time and space can reveal perceptual differences between the user and the expert.

In some embodiments, the expert rationales for all selected objects may be displayed serially at the end of the expert simulation. In various embodiments, the expert rationales for all selected objects may be displayed concurrently at the end of the expert simulation. In numerous embodiments, the expert rationales for individual selected objects may be displayed directly after receiving the freeform rationale.

Further, there may be an indication on whether the unprompted selection of an object from the user is a selection of a tagged object at the time the unprompted selection is received. For example, if there are three tagged objects in the expert simulation and the user selects four objects throughout the expert simulation, then at least one of those selections is a selection of an untagged object. After the expert simulation plays through, directly after the freeform rationale is received, or instead of providing the entry interface, there is an indication that the selected untagged object is not tagged.

For example, there may be a marker in a timeline of the expert simulation that displays where the user selected an object. Selections of a tagged objects may be displayed by a marker of a first color (e.g., green), and selections of untagged objects may be a second color (e.g., red). Further, if there was a tagged object that was not selected, then there may be a marker of a third color (e.g., blue) indicating that a tagged object was not selected.

In some embodiments, the entire expert simulation may play through multiple times (i.e., multiple sweeps), and the user may be given instructions for each sweep. For example, in a first sweep, the expert simulation may be played for the user, where the user is not to select any objects within the expert simulation. As such, during this first sweep, all unprompted selections from the user are ignored.

In a second sweep, the same expert simulation is played again for the user, but this time, the selections from the user are not ignored. If the user does select an object, then the second sweep is paused, and the user may enter a freeform rationale as to why the user selected the object, as discussed above. Once the freeform rationale is received, the second sweep of the expert simulation resumes until another selection of an object by the user.

In a third sweep, the expert rationales associated with the tagged objects are displayed (possibly along with the user-entered freeform rationale) at the corresponding times in the third sweep. Further, the third sweep may provide an accuracy score that is calculated based on the number of tagged objects the user correctly selected and the number of untagged objects the user selected. Thus, the user may compare the objects the expert identified as of interest with the objects that the user identified as of interest and compare the user's rationales with the expert rationales. As mentioned above, the tagged and selected objects may be marked with a first color, the tagged and unselected objects may be marked with a second color, and the untagged and selected objects may be marked in a third color during the third sweep.

Other numbers of sweeps may be shown. For example, a first sweep may allow the user to select objects and a second sweep may display the expert rationales. As another example, a first sweep may show the expert simulation and ignore the selections by the user, while the second sweep accepts the selections and displays the expert rationales to the user. There may also be more than three sweeps.

Therefore, the user may learn to recognize patterns and objects of interest without being subjected to possible dangers in the field. Further, an expert does not need to be on hand for the novice to learn from the expert.

Figure 2:
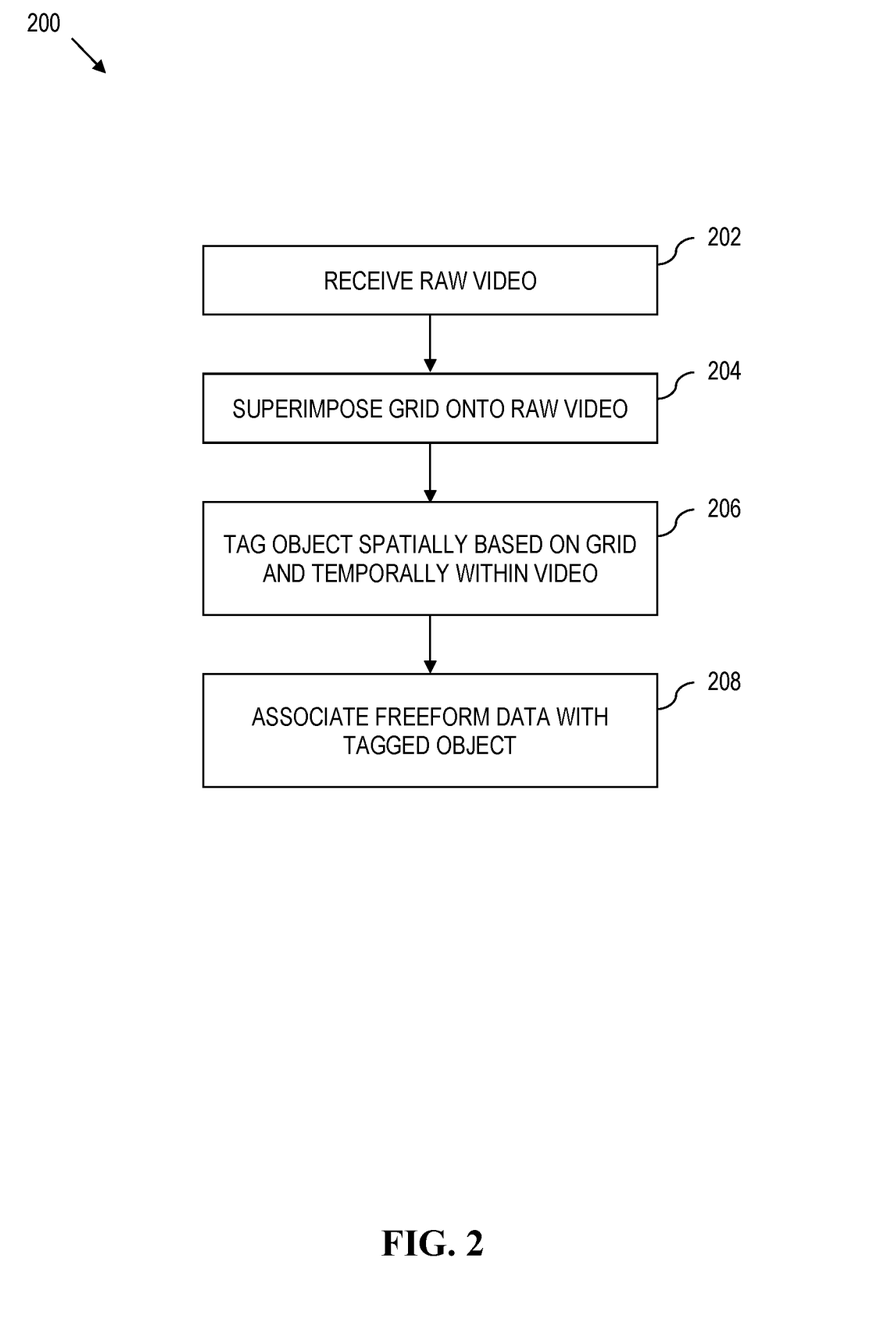
FIG. 2 is a flowchart illustrating a process for creating an expert simulation, according to various aspects of the present disclosure.

Turning now to FIG. 2, a process 200 for creating an expert simulation is shown. As with the process 100 of FIG. 1, the process 200 may be implemented on computer-readable hardware that stores machine-executable program code, where the program code instructs a processor to implement the described method. The process 200 may also be executed by a processor coupled to memory, where the processor is programmed by program code stored in the memory, to perform the described process.

At 202, raw video is received. For example, an expert (i.e., an author of the expert simulation) selects video that is relevant to the domain of knowledge for the expert. For example, a police officer who is an expert at de-escalating dangerous situations may start with a video created by a body camera of a police officer in a dangerous situation. As such, the video is not a scripted video, but is a video of a real situation in the domain of the expert.

As discussed herein, an expert may be one person or may be a panel of people who all lend their expertise to creating the expert simulation.

Moreover, the video should include a time element. For example, each frame of the video may be marked for a time element. As another example, timestamps of a half a second may be introduced into the video. The granularity of the time between frames/timestamps may be any amount of time.

At 204, a grid is superimposed on the received raw video. Any granularity for the grid may be used. However, the grid size may be reliant on the selection area of the cursor presented to the user during a playback. For example, the grid size should allow for several pixels of the grid to be in the selection area of the cursor.

At 206, an object is tagged within the video. For example, the expert may define a tagged object by spatial coordinates (e.g., X-Y coordinates) using the superimposed grid. Further, the expert may add a temporal designation to the object such that the object is tagged only for a certain amount of time or a certain number of frames.

At 208, freeform data is associated with the tagged object. For example, the expert may provide an expert rationale on why the object was tagged. Thus, during playback to a user, the expert rationale may be displayed. The freeform expert rationale may be stored as metadata with the video or in a separate file.

Further, the expert may indicate a number of times (i.e., a number of sweeps) the expert simulation is to be played for the user. The sweeps are discussed above in relation to FIG. 1.

Once the expert simulation is created, it may be stored in a database for any novice in the domain of the expert to access for playback and training within that domain, as discussed above in relation to FIG. 1.

Figure 3:
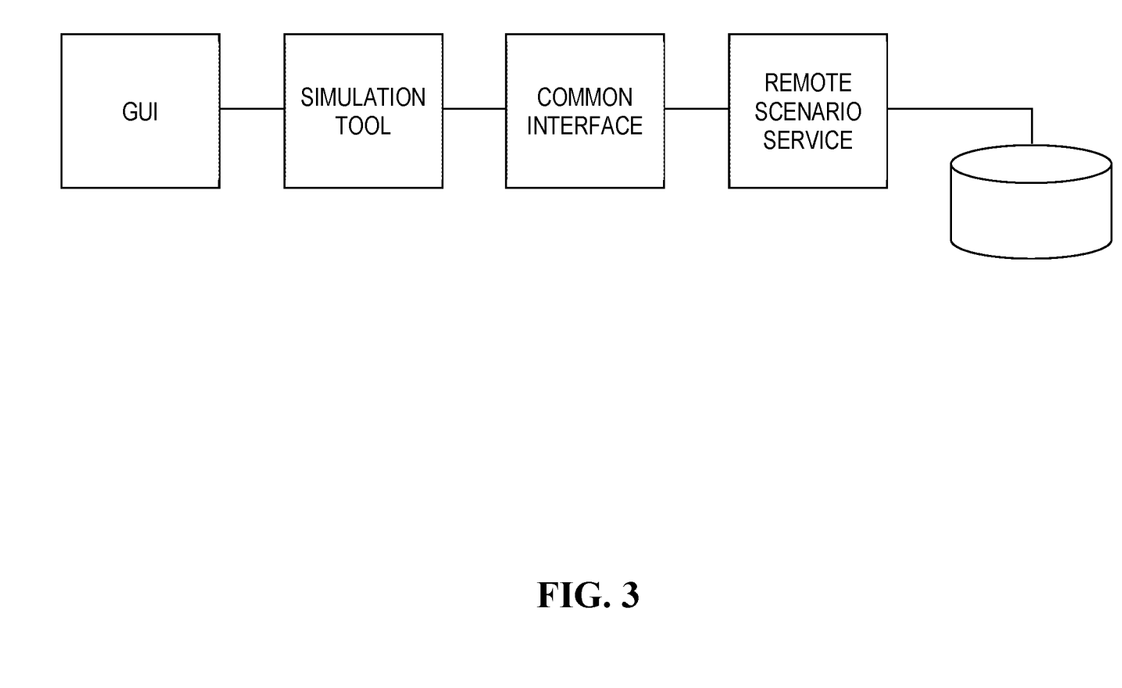
FIG. 3 is a block diagram of a system for taking an expert simulation (i.e., scenarios), according to various aspects of the present disclosure.

FIG. 3 is a block diagram illustrating a system 300 for a user to run a simulation that was created by an expert. When starting, the user is presented one or more simulations for preview via an interface 302. When the user selects a simulation via the interface 302 of a simulation tool 304, instructions for the simulation are shown and a "get started" button is presented via the interface 302.

In some embodiments, once the user selects the get started button, a location tab pops up. Thus, the user may specify a location (e.g., a facility, a company name, a pinpoint on a map, etc.). The user may skip disclosing a location and proceed directly to a "start" scenario button. Once the user selects the start button, the simulation tool 304 requests a thumbnail of the scenario. For example, the scenario may be stored on a cloud service, on a remote scenario service 308 (via a common interface 306 described in greater detail below) with a database 310, locally on a machine running the simulation tool, etc.

When the user selects and starts the scenario, a scene of the scenario is loaded and media of the scene is shown to the user. Further, the simulation tool 304 may start to preload other scenes while the user is watching a specific scene. That way, there is little or no down time between scenes of a scenario.

While the scenario is playing, the user may use a cursor to markup the scenario (if allowed) or to select objects within the scenario. If the scenario allows for multiple sweeps (see above), then there may be a button that allows the user to start a new sweep. Further, the user may provide and save feedback and insight via the interface 302.

Figure 4:
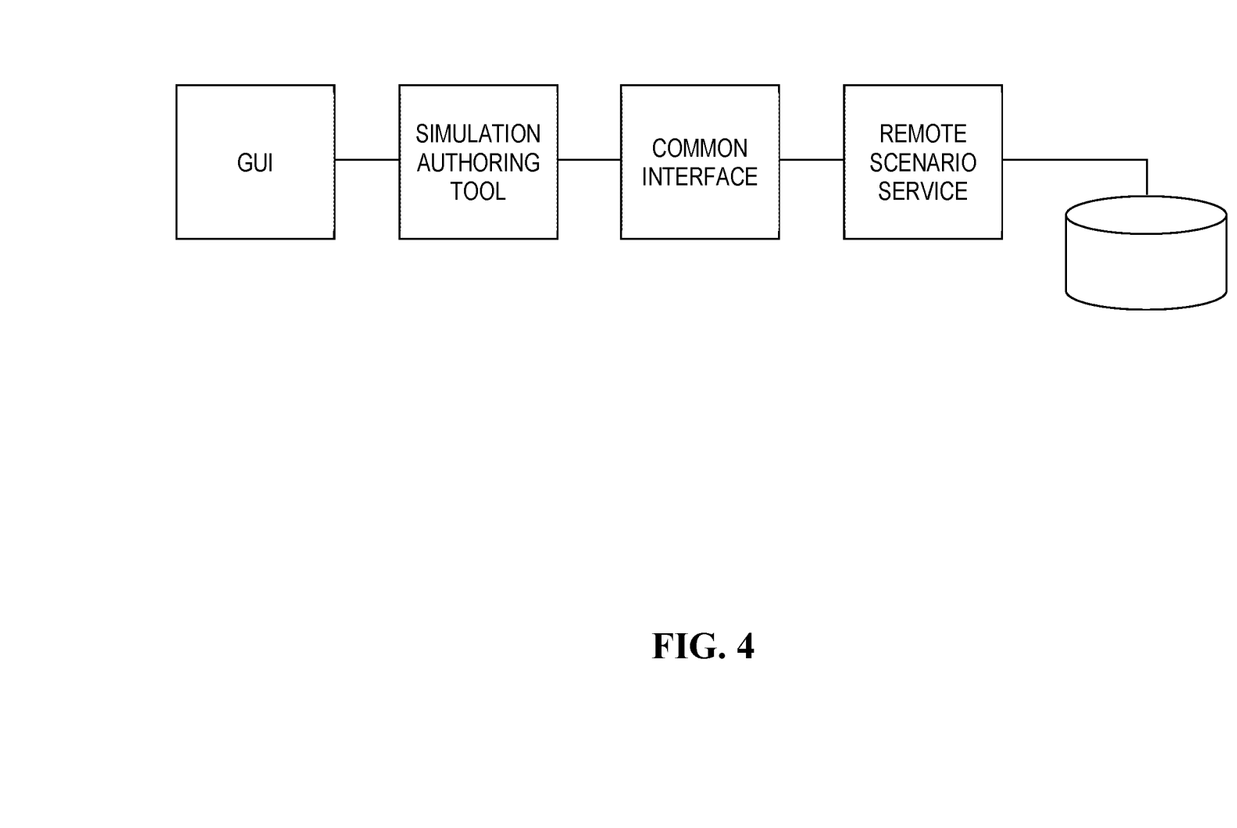
FIG. 4 is a block diagram of a system for authoring expert simulations (i.e., scenarios), according to various aspects of the present disclosure.

FIG. 4 is a block diagram that shows interactions between different aspects of the authoring process discussed above in relation to FIG. 2. An expert interacts with an interface 402 of a simulation authoring tool 404 to request creation of a new scene for a simulation (e.g., the expert pushes a NEW SCENE button in the interface). When the simulation authoring tool 404 received the request to a command for a new scene is sent through a common interface 406 to a remote scenario service 408. For example, the common interface 406 may translate a proprietary CREATE NEW SCENE command into a generic XML (extensible markup language) command to send to the remote scenario service 408. The remote scenario service 408 creates a new scene to store in a database 410 and sends a confirmation that the scene is created to the common interface 406. In an alternate implementation, there is no remote scenario service, and the scenes and simulations are stored on the same device that runs the simulation authoring tool and a playback tool. In yet another implementation, the scenes may be stored via a cloud service (e.g., Amazon S3).

The expert may then add media to the scene. For example, the media may be locally stored video, video stored with the remote scenario service 408, etc. Then, the expert may perform the process 200 of FIG. 2 (i.e., superimpose grid, tag object, associate freeform data, etc.) to create the scene, which may be stored in the database 410 of the remote scenario service 408. Further, the expert may give the scene a scene identification and a position within the overall scenario. Such information may be stored in a JSON (JavaScript Object Notation) object (or any other type of object) for future use.

Thus, the expert simulations are not necessarily stored or created locally on a machine. Instead, a playback tool (e.g., a Shadowbox tool) may retrieve videos, media, scenes, etc. from a database for an expert to author into an expert simulation. During a playback, a playback tool (running the process 100 of FIG. 1) may access the database to obtain the expert simulation for playback instead of requiring a removable medium or a locally stored copy on the playback tool. Shadowbox is a registered trademark of SB Concepts a limited liability company of Ohio, located at 5335 Far Hills Ave., Suite 217, Dayton, Ohio 45429, with a trademark registration number of 4865430.

If the expert wants to add the newly created scene to a scenario, the expert interacts with the interface 402 (e.g., presses an ADD SCENE button) and sends the scene identification to the simulation authoring tool 404. For example, the JSON object created for the scene may be sent. Following the path described above, the JSON object is translated into a common format (e.g., XML) and sent to the remote scenario service 408 that retrieves the newly created scene from the database 410 and sends the scene to the simulation authoring tool 404, which displays the scene via the interface 402 to the expert as a scene card. The expert may then add the new scene to the scenario.

To get the media that will be associated with the scene, the expert may upload a media object to the remote scenario service, use locally stored media, access media from a cloud service, combinations thereof, etc. In any case, the media may be presented to the expert via the interface 402 as thumbnails. Further, the media may have certain restrictions associated with them. For example, an expert may only have access to the media files that the expert uploads. As such, only those thumbnails are displayed for that expert.

When assembling scenes into a full scenario, the expert may decide on various options. For example, the expert can select how accurate the expert will need to be when selecting an object, a number of playbacks (i.e., sweeps), whether the expert may seek (i.e., fast forward or rewind) during a playback, add instructions, markup the video, points per question, variance, etc. These options may be universal throughout the simulation or may change based on a position within the simulation.

To add markup to media of a scene, the expert may play the media (e.g., video) until the media reaches a desired point and then markup the media as desired. For example, the expert may highlight an object within a third sweep of the video, so the user may see the object more clearly. Such markup is sent to the simulation authoring tool 404 via an object (e.g., JSON object), and the simulation authoring tool 404 sends the object the remote scenario service, as described above. The object may include information such as an identification, a time within the video, coordinates, feedback, etc.

When the simulation (i.e., scenario) is complete, the expert may save the simulation via the interface 402. Upon saving, everything is saved and sent for storage via an object or series of objects. As with the individual scenes, media, etc., the simulation may be saved locally, remotely through a service, on the cloud, or combinations thereof.

Figure 5:
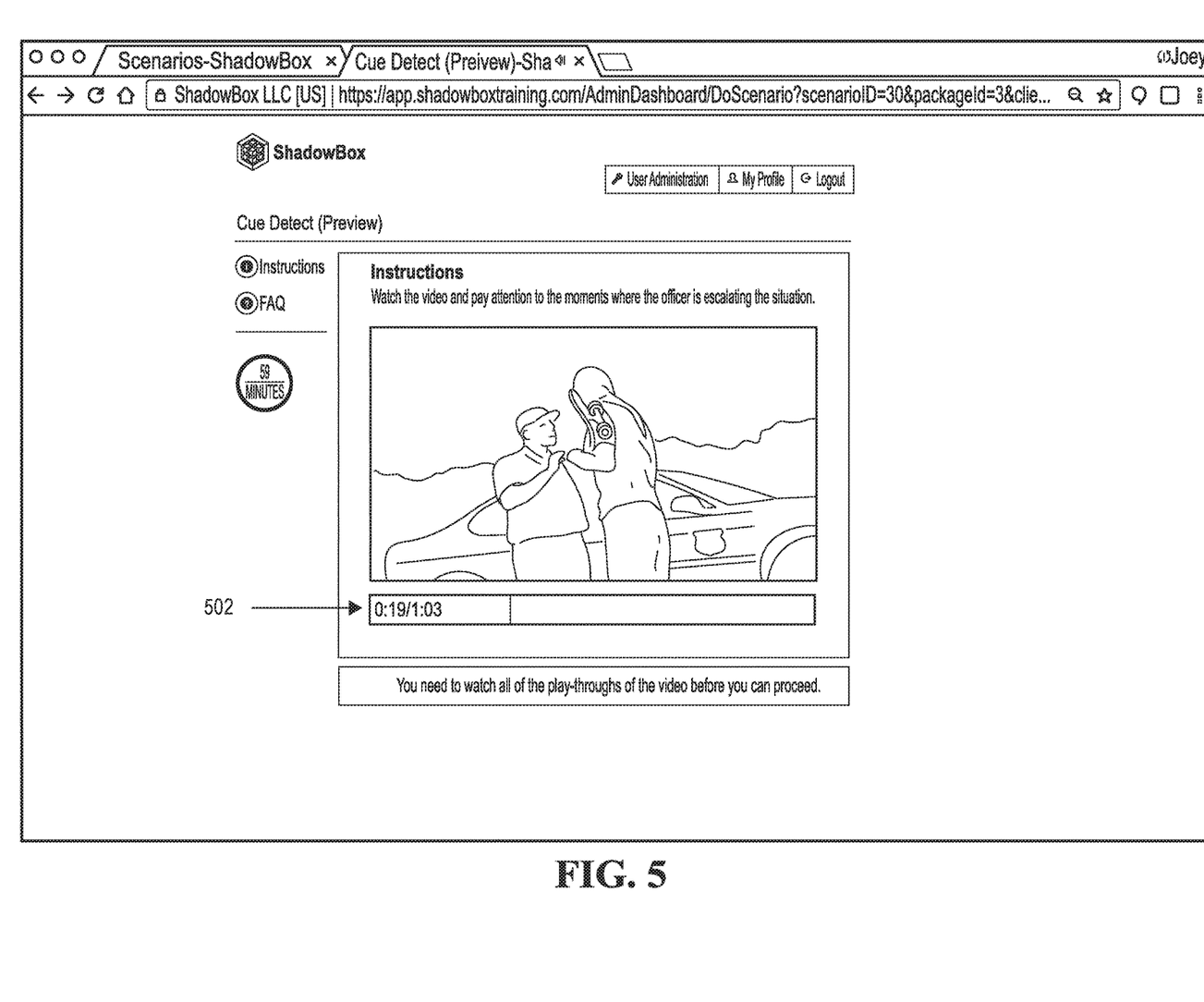
FIG. 5 is a screenshot of a first sweep through an example playback of an expert simulation, according to various aspects of the present disclosure.
Figure 6:
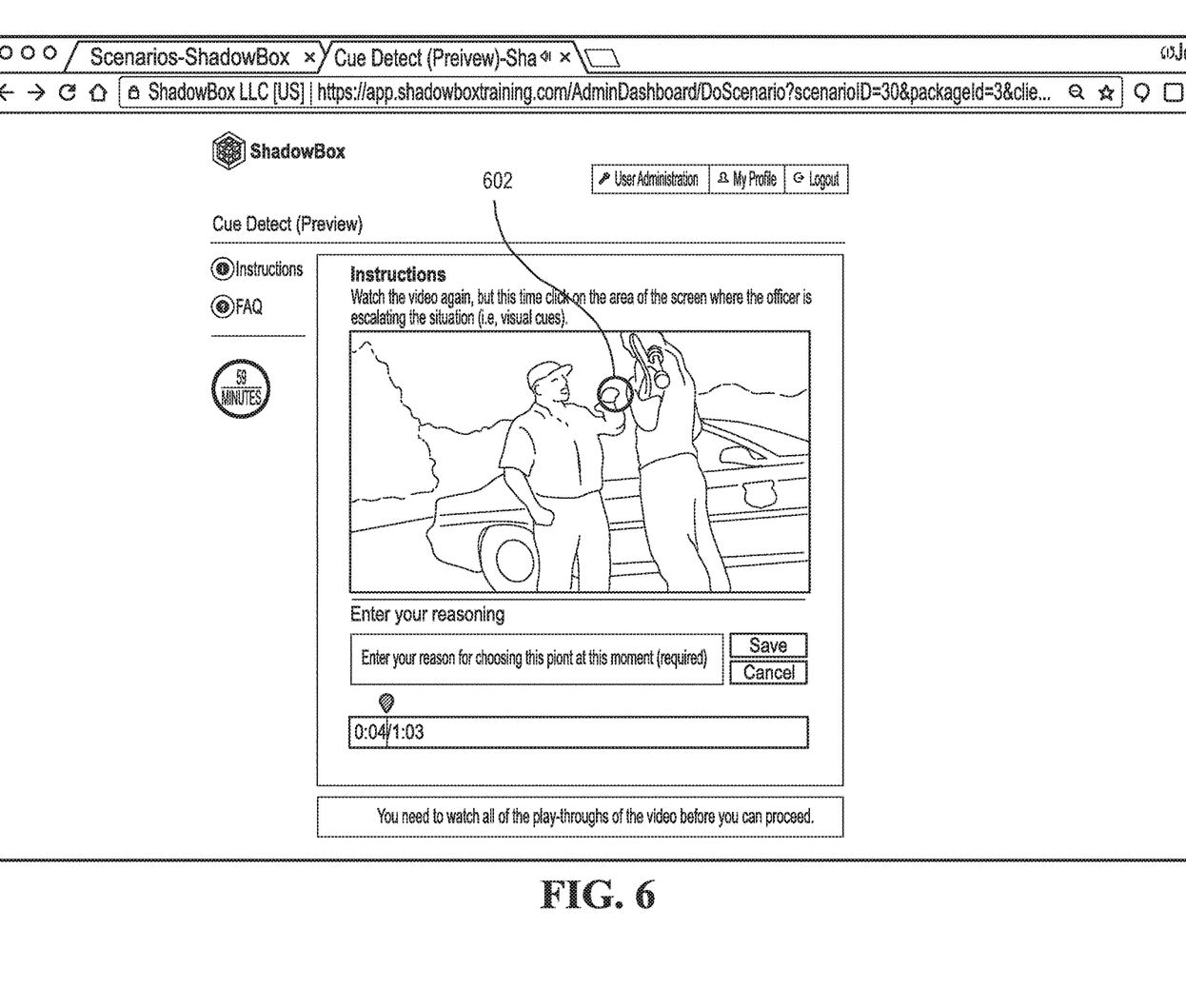
FIG. 6 is a screenshot of a second sweep through the example playback of the expert simulation of FIG. 5, according to various aspects of the present disclosure.
Figure 7:
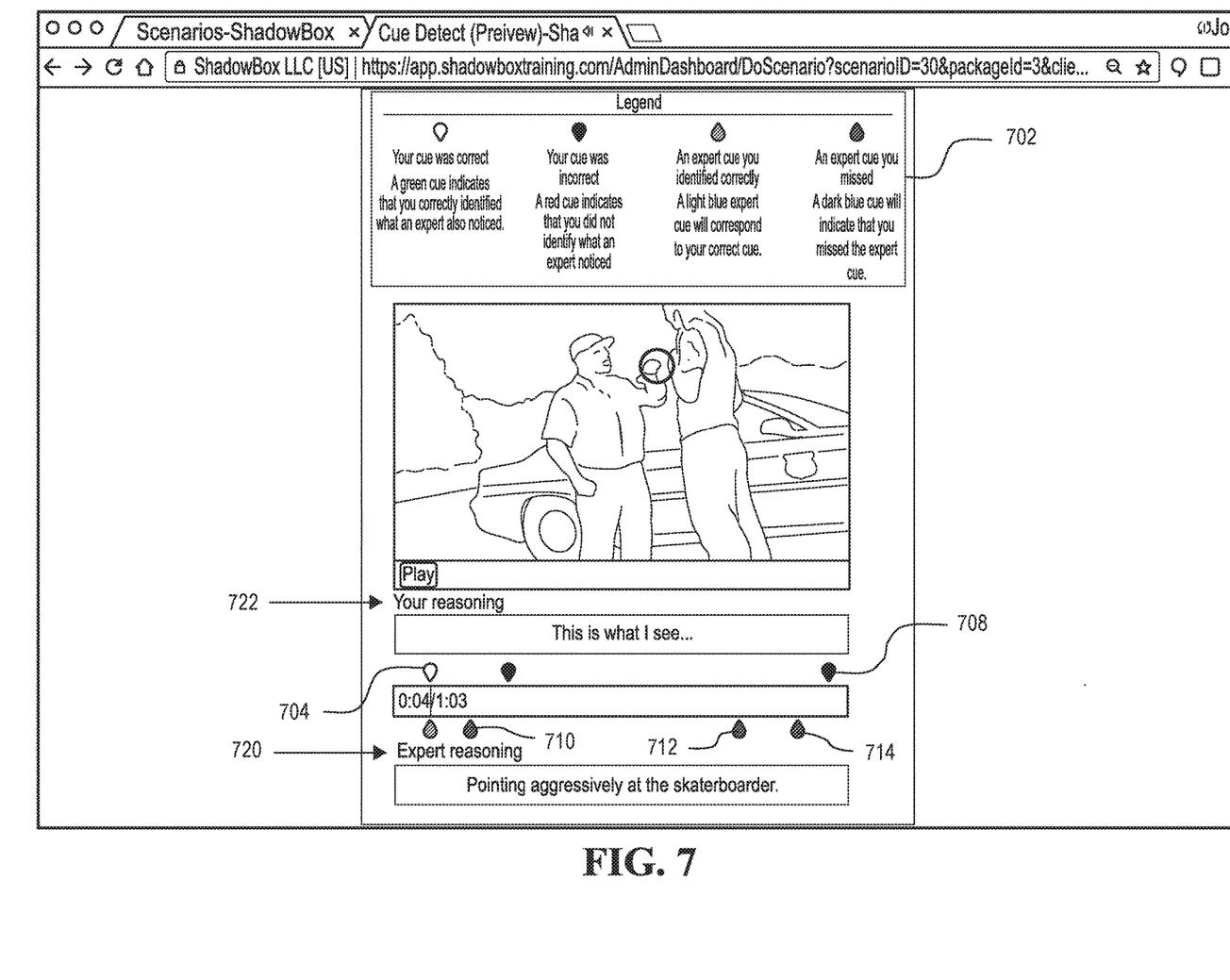
FIG. 7 is a screenshot of a third sweep through the example playback of the expert simulation of FIGS. 5-6, according to various aspects of the present disclosure.

FIGS. 5-7 provide an example of a portion of the process 100 of FIG. 1. Specifically, FIG. 5 is an example screenshot of a first playback (i.e., first sweep) of an expert simulation in the domain of de-escalating situations involving police officers. The expert simulation is 019 timestamps through the total of 103 timestamps in the expert simulation, as shown by the bar 502 at the bottom of the screenshot. This screenshot represents a first sweep through the expert simulation, as noted in the instructions: "Watch the video and pay attention to the moments where the officer is escalating the situation."

FIG. 6 is an example screenshot of a second sweep of the expert simulation of FIG. 5, as noted in the instructions: "Watch the video again, but this time click on the area of the screen where the officer is escalating the situation (i.e., visual cues)." The user has moved the cursor 602 (an annulus in this case) to encapsulate the officer's hand poking the other person in the screenshot and selected the first as an object. The expert simulation is paused, and an entry interface is shown below the video.

FIG. 7 is an example screenshot of a third sweep of the expert simulation of FIG. 5. Note that the top includes a legend 702 of whether the user identified tagged objects correctly (tagged objects are sometimes referred to as "cues" herein). The user selected three objects, where one selection 704 was selected correctly (i.e., selection of a tagged object) and the other two selections 706, 708 were incorrect selections (i.e., selection of an untagged object). Further, there are three tagged objects 710, 712, 714 that were not selected. Moreover, the expert rationale 720 is shown below the user-entered freeform rationale 722.

Figure 8:
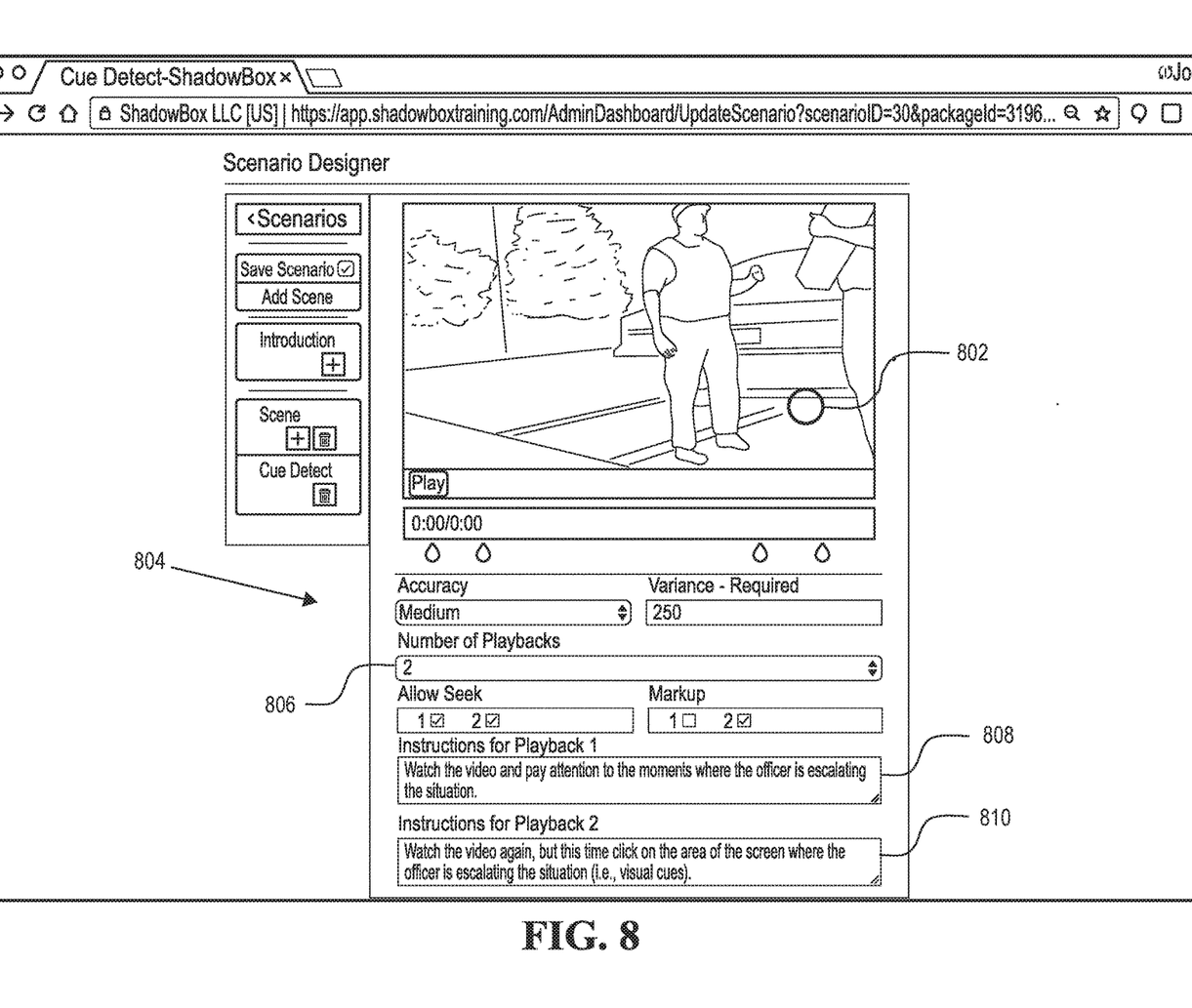
FIG. 8 is a screenshot of an example of creating an expert simulation, according to various aspects of the present disclosure.

FIG. 8 is an example screenshot of an authoring tool running the process 200 of FIG. 2 for creating an expert simulation. The authoring tool includes an entry 802 for how accurate a user must be in selecting an object. For example, if more accuracy is required, then the selection area of the cursor 804 will be smaller. As such, the selection area of the cursor may be inversely proportional to the required accuracy. As another option, the size of the cursor may be independent of the grid size, based on an aspect ratio of the video, based on a frame rate of the video, or combinations thereof.

Further, there is an entry 806 for the expert to indicate how many playbacks (or sweeps) of the expert simulation there will be. Plus, there are entries 808, 810 for instructions for each of the playbacks.

Figure 9:
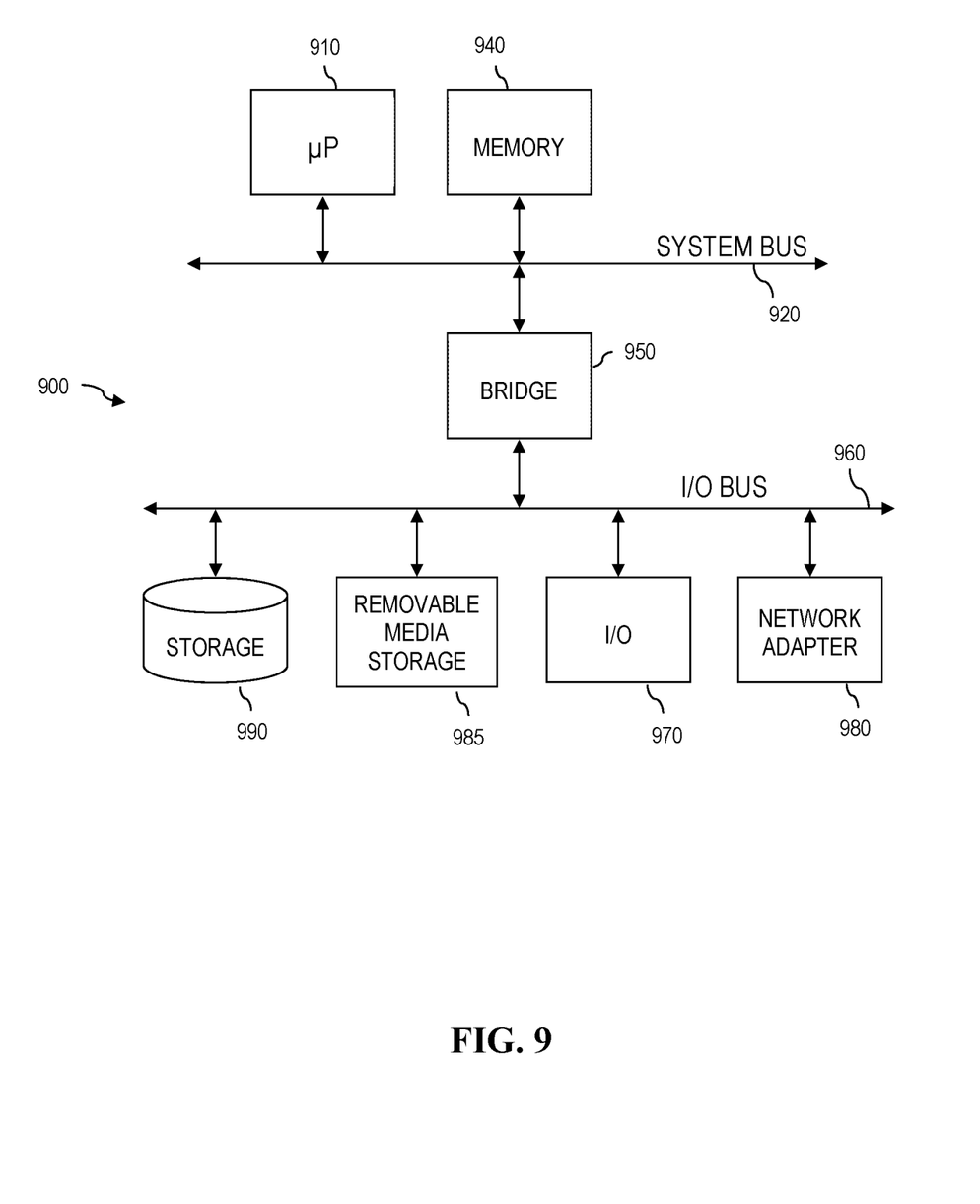
FIG. 9 is a block diagram of a computer system having a computer readable storage medium for implementing functions, according to various aspects of the present disclosure.

Referring to FIG. 9, a block diagram of a data processing system is depicted in accordance with the present invention. Data processing system 900 may comprise a symmetric multiprocessor (SMP) system or other configuration including a plurality of processors 910 connected to system bus 920. Alternatively, a single processor 910 may be employed. Also connected to system bus 920 is a local memory 940. An I/O bus bridge 950 is connected to the system bus 920 and provides an interface to an I/O bus 960. The I/O bus 960 may be utilized to support one or more buses and corresponding devices 970, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a network adapter 980, storage 990 and a computer usable storage medium 995 having computer usable program code embodied thereon. The computer usable program code may be executed to implement any aspect of the present invention, for example, to implement any aspect of any of the methods and/or system components illustrated in the figures above.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for training a user, the process comprising:
   creating an expert simulation comprising objects including tagged objects and untagged objects, the creating comprising:
   receiving raw video;
   superimposing a grid onto the raw video;
   tagging a select object within the video, wherein:
   the select object is tagged spatially based on the grid; and
   the select object is tagged temporally for a predetermined amount of time based on two absolute timestamps within the video;
   assigning an accuracy value to the tagged object; and
   associating freeform data in the form of an expert rationale with the tagged object; and
   simulating an expert experience, the simulating comprising:
   playing an expert simulation on a video screen for a user;

receiving an unprompted selection of an object of the objects in the expert simulation on the video screen, wherein the unprompted selection is from the user using a cursor;

pausing, in response to receiving the unprompted selection of the object, the expert simulation so the user has time to enter the freeform rationale without missing a portion of the expert simulation;

providing a digital text box for the user to enter in a freeform rationale, wherein providing the digital text box is in response to receiving the unprompted selection from the user using the cursor;

receiving a freeform rationale from the user through the provided digital text box;

resuming the expert simulation when the freeform rationale is received; and displaying the expert rationale associated with the tagged object on the video screen if the user selected the tagged object as the unprompted selection, so the user may compare the freeform rationale with the expert rationale.

2. A process for training a user, the process comprising:

creating an expert simulation comprising objects including tagged objects and untagged objects, the creating comprising:

receiving raw video;

superimposing a grid onto the raw video;

tagging a select object within the video, wherein:
the select object is tagged spatially based on the grid; and
the select object is tagged temporally for a predetermined amount of time based on two absolute timestamps within the video;

assigning an accuracy value to the tagged object;

associating freeform data in the form of an expert rationale with the tagged object;

indicating the expert simulation should be played three times through; and simulating an expert experience, the simulating comprising:

providing a cursor for control by the user, wherein the cursor is a circle and a selection area comprises multiple pixels and an area inside the circle;

playing the expert simulation on a video screen for the user for a first time and ignoring all unprompted selections from the user during the first playing of the expert simulation on the video screen;

playing the expert simulation for the user on the video screen for a second time and performing the following during the second playing of the expert simulation on the video screen:

receiving an unprompted selection of an object of the objects in the expert simulation on the video screen, wherein the unprompted selection is from the user using a cursor;

pausing, in response to receiving the unprompted selection of the object, the expert simulation so the user has time to enter the freeform rationale without missing a portion of the expert simulation;

providing a digital text box for the user to enter in a freeform rationale, wherein providing the digital text box is in response to receiving the unprompted selection from the user using the cursor; and receiving a freeform rationale from the user through the provided digital text box;

resuming the expert simulation when the freeform rationale is received;

playing the expert simulation for the user for a third time and performing the following during the third playing of the expert simulation:

displaying the expert rationale associated with the tagged object on the video screen if the user selected the tagged object as the unprompted selection, so the user may compare the freeform rationale with the expert rationale; and indicating whether any tagged objects in the simulation were not selected by the user.

\* \* \* \* \*

UNITED STATES PATENT AND TRADEMARK OFFICE
CERTIFICATE OF CORRECTION

PATENT NO. : 10,573,193 B2
APPLICATION NO. : 15/977268
DATED : February 25, 2020
INVENTOR(S) : Allan Gary Klein et al.

Page 1 of 1

It is certified that error appears in the above-identified patent and that said Letters Patent is hereby corrected as shown below:

In the Specification

Column 7, Line 46, "the first as an" should read --the fist as an--.

Signed and Sealed this
Fifth Day of May, 2020

Andrei Iancu
*Director of the United States Patent and Trademark Office*